US008935571B2

(12) United States Patent  (10) Patent No.: US 8,935,571 B2
Lee  (45) Date of Patent: Jan. 13, 2015

(54) VISUAL OUTAGE MANAGEMENT WIZARD PLUG-IN

(75) Inventor: Brian Lee, Plainfield, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 335 days.

(21) Appl. No.: 13/310,929

(22) Filed: Dec. 5, 2011

(65) Prior Publication Data

US 2013/0145205 A1 Jun. 6, 2013

(51) Int. Cl.
*G06F 11/00* (2006.01)

(52) U.S. Cl.
USPC .................................. 714/26; 714/41; 714/25

(58) Field of Classification Search
USPC ............. 714/4.1, 25, 26, 33, 37, 38.1, 40, 43, 714/46, 48, 57
See application file for complete search history.

(56) References Cited

U.S. PATENT DOCUMENTS

| 5,946,373 | A | 8/1999 | Harris |
| 6,928,147 | B2 | 8/2005 | Gonsalves et al. |
| 7,428,300 | B1 | 9/2008 | Drew et al. |
| 7,542,428 | B1 | 6/2009 | Johnson et al. |
| 7,600,160 | B1 * | 10/2009 | Lovy et al. ...................... 714/57 |
| 8,265,980 | B2 * | 9/2012 | Ochs et al. ...................... 714/26 |
| 2007/0028147 | A1 * | 2/2007 | Huang et al. .................... 714/43 |
| 2008/0172574 | A1 * | 7/2008 | Fisher ............................. 714/25 |
| 2011/0119375 | A1 * | 5/2011 | Beeco et al. .................. 709/224 |
| 2011/0231704 | A1 * | 9/2011 | Ge et al. .......................... 714/26 |
| 2013/0007538 | A1 * | 1/2013 | Gupta et al. .................... 714/57 |

* cited by examiner

*Primary Examiner* — Joseph D Manoskey
(74) *Attorney, Agent, or Firm* — Fay Kaplun & Marcin, LLP (57) ABSTRACT

Described herein are systems and methods related to a plug-in for a visual tool as a real-time knowledge transfer agent between network outages. One embodiment relates to a method comprises retrieving current outage data related to a current operation of a network, retrieving historical outage data related to a prior operation of the network, correlating the current outage data with the historical outage data, and constructing a resolution process plan for repairing a current outage based on correlations between the current outage data and the historical outage data.

20 Claims, 4 Drawing Sheets

VISUAL OUTAGE MANAGEMENT WIZARD PLUG-IN

CROSS-REFERENCE TO RELATED APPLICATIONS

This patent application relates to the co-pending and commonly assigned U.S. patent application Ser. No. 12/962,215, filed Dec. 7, 2010, and entitled "Visual Outage Management Tool," of which the "Brief Description Of The Drawings" section and the "Detailed Description" section are incorporated herein by reference.

BACKGROUND

The terms "downtime" and "network outage" are used to refer to periods when a communication system is unavailable. Downtime or outage duration refers to a period of time that a system fails to provide or perform its functions. The causes of a network outage include failures in various network components such as: hardware failures (e.g., servers and other physical equipment), software failures (e.g., logic controlling equipment), interconnecting equipment failures (e.g., cables, routers, etc.), wireless transmission failures (e.g., antennas, satellites, etc.), and capacity failures (e.g., exceeding system limits).

Typically, it is the responsibility of the network designers to ensure that a network outage does not happen. However, if a network outage does occur, a network monitoring system may reduce the effects of the outage by detecting and restoring the network as quickly as possible. The restoration of the network generally requires involvement from several individuals and teams of individuals including technical engineers, management personnel, executives, etc.

Within the field of telecommunications, mission critical applications, interfaces, middleware components and downstream systems are continually changing. With these changes come increased difficulty and challenges for engineers and support team members to stay up to date with the technical picture and their understandings of related components involved in the early stages of the outage, and throughout critical triage activities. In a time when minutes equals millions, communication and collaboration amongst telecommunication personnel during a network outage is antiquated and inefficient. Currently, there exists a critical knowledge and communication gap between interested parties (e.g., engineers, executives, etc.) due to a lack of a complete picture of precisely what is occurring during the outage as well as the impact created by the outage.

SUMMARY

Described herein are systems and methods related to a plug-in for a visual tool as a real-time knowledge transfer agent between network outages. One embodiment relates to a method comprises retrieving current outage data related to a current operation of a network, retrieving historical outage data related to a prior operation of the network, correlating the current outage data with the historical outage data, and constructing a resolution process plan for repairing a current outage based on correlations between the current outage data and the historical outage data.

A further embodiment relates to a non-transitory computer readable storage medium including a set of instructions that are executable by a processor, the set of instructions being operable at least to retrieve current outage data related to a current operation of a network, retrieve historical outage data related to a prior operation of the network, correlate the current outage data with the historical outage data, and construct a resolution process plan for repairing a current outage based on correlations between the current outage data and the historical outage data.

A further embodiment relates to an outage management plug-in tool comprising a data retrieval component retrieving current outage data related to a current operation of a network, wherein the data retrieval component further retrieves historical outage data related to a prior operation of the network, a processing component correlating the current outage data with the historical outage data, and a reporting component constructing a resolution process plan for repairing a current outage based on correlations between the current outage data and the historical outage data.

DETAILED DESCRIPTION

The exemplary embodiments described herein may be further understood with reference to the following description and the related appended drawings, wherein like elements are provided with the same reference numerals. The exemplary systems and methods described herein relate to a plug-in for a visual tool as a real-time knowledge transfer agent between network outages. An exemplary visual tool may provide a dynamic and accessible collaborative environment during a production outage or network downtime, such as a P1 production outage.

As will be described below, the exemplary embodiments are related to an analytical, autonomous agent for summarizing pertinent historical data captured by a visual outage management ("VOM") tool. Specifically, the agent, or VOM wizard plug-in may assemble, correlate and recapitulate network outage information related to both historical outages as well as current outages. Accordingly, the VOM wizard plug-in may analyze and report outage information from one outage to the next, thereby facilitating a more aggressive approach to outage triage efforts and a reduction of mean time to repair ("MTTR").

The exemplary VOM tool discussed throughout may be described as a socially collaborative application for articulating the scope of a production outage by providing a live, continually updating (e.g., "real-time"), and visual representation of various network components involved in the outage. In other words, this visual tool creates a robust, user-friendly, highly interactive production monitoring system and communication tool. Accordingly, the VOM tool may allow concerned parties (e.g., outage attendees, technical engineers, management and executive team members, etc.) to effectively understand, communicate and contribute to resolving a production outage. Furthermore, an exemplary VOM tool may provide a public dashboard of sorts, to the benefit outage attendees of all skill levels. The socially collaborative environment of the VOM tool may differentiate this visual tool from any other network diagnostic/mapping systems used during network outages.

Therefore, the VOM tool helps bridge the gap between technical, managerial, and executive levels during a critical outage call. Three-dimensional ("3D") representations may be provided through various components, such as "visual battlefield" plug-ins. One skilled in the art would understand that a plug-in may refer to a set of components that add specific capabilities to a larger application, thereby allowing for customizations to the functionality of the application. Accordingly, the exemplary VOM wizard plug-in may be a configurable plug-in (e.g., an "add-on" component) of the VOM tool.

During a typical network outage, communication across different levels of personnel may rely on "chat rooms" and conference calls in order to diagnose and troubleshoot the outage. However, these conventional procedures are neither effective nor efficient enough to service a mission critical production outage, such as a P1 outage. Consequently, status updates are continuously outdated and/or redundant resulting in technical engineers being inefficiently informed as to the depth and breadth of an outage. Timely communication and collaboration amongst technical engineers and between other levels of personnel can drastically improve the understanding and analysis of the outage as well as the restoration of the involved components and networks. Chat rooms and conference calls alone are simply not effective enough to suitably address and resolve mission critical applications and systems when added minutes in response time costs millions in revenue and resources.

Currently, the efficiency of outage triage efforts and MTTR rely on a multitude of variables. These variables may include, for instance: the technical expertise of the individual support team members in attendance; the richness, dissemination and promptness of retrieving previous and relevant outage information; efficient and proper analysis of the current outage information and its variables; proper correlation and knowledge to the previous outage; and ultimately, how quickly the proper and decisive actions can be taken to facilitate outage resolution.

The exemplary VOM wizard plug-in of the VOM tool may be an active autonomous software agent that addresses at least these variables and provides a decisive path, or "battle plan,", forward in achieving a more aggressive outage resolution result. In other words, each of the visual battlefield plug-ins described herein, including the VOM wizard plug-in, may facilitate improved focus and communication in order to allow for a more effective utilization of time, effort and resources during this critical outage period. Thus, the VOM tool and the VOM wizard plug-in may greatly reduce the MTTR while providing significant cost-avoidance opportunities. It should be noted that the exemplary VOM tool and its plug-ins may be leveraged using existing production components and documentations.

Figure 1:
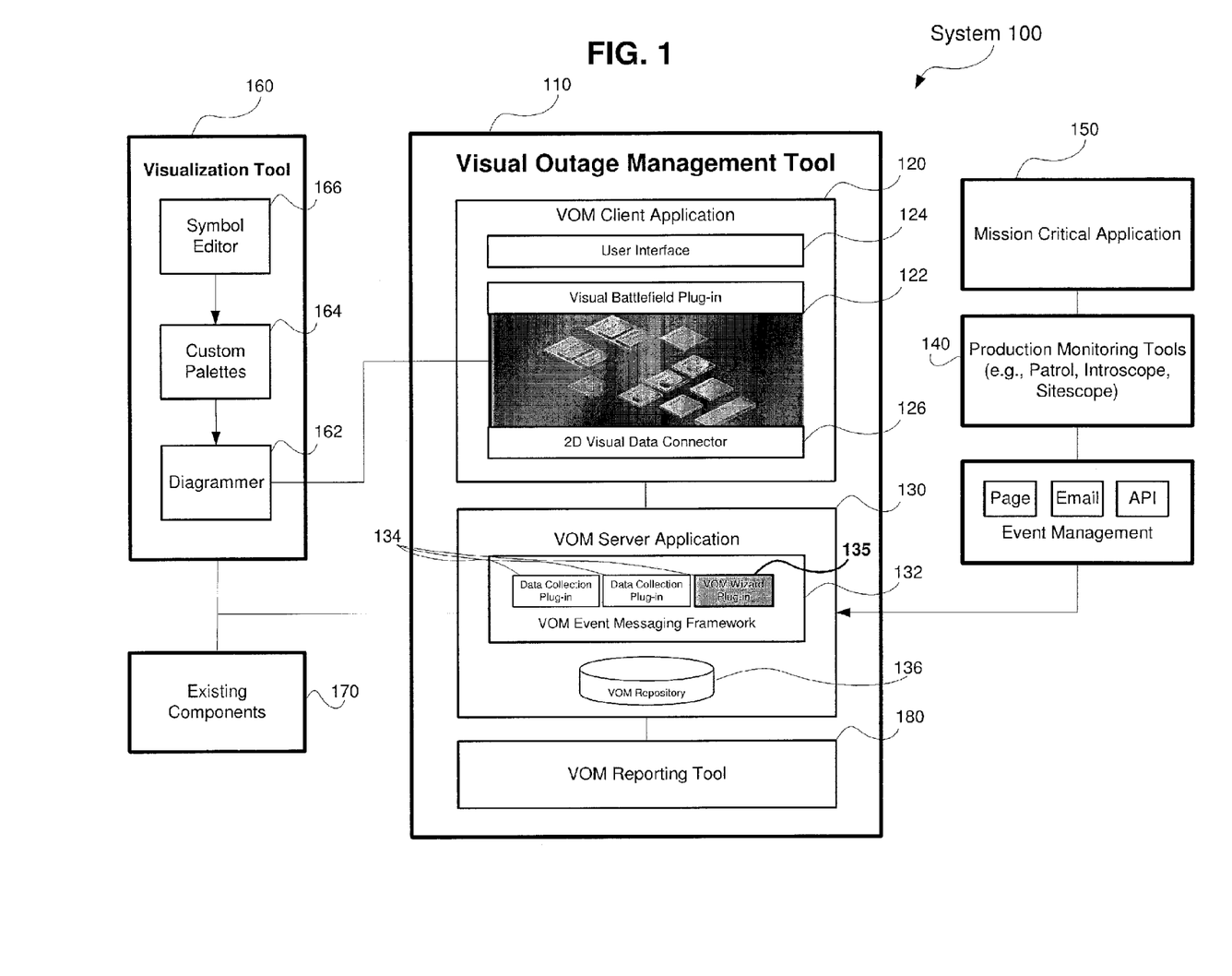
FIG. 1 shows an overview of an exemplary system for providing a visual representation of software and network monitoring data across various components according to an exemplary embodiment.

FIG. 1 shows an overview of an exemplary system 100 for providing a visual representation of software and network monitoring data across various components according to an exemplary embodiment. The system 100 may include a visual outage management tool, or VOM tool 110, for receiving, processing, and displaying data related to the network and its components in a socially collaborative environment. The VOM tool 110 may include applications and tools, such as a VOM Server Application 130 for collecting network data, a VOM Client Application 120 for reporting network data, and a VOM reporting tool 180. According to the exemplary embodiments, the Server Application 130 may utilize a plurality of data collection plug-ins 134 including the VOM wizard plug-in 135.

The VOM tool 110 may be a web-based piece of software (e.g., such as a Java/Webstart enabled application). Accordingly, the VOM tool 110 may operate directly through the Internet using a web browser. In addition, this web-based VOM tool 110 may interact with existing components 170 in order to ensure consistency of data between multiple systems and organizations, while allowing users to generate reports that are meaningful to several different levels of personnel (e.g., engineers, management, executive, etc.).

The VOM Server Application 130 may collect data from production monitoring tools 140 (e.g., Patrol, Introscope, Sitescope, etc.) while monitoring one or more mission critical applications 150. In addition, further data may be received and imported into the VOM tool 110 from components such as visualization systems 160 (e.g., IBM ILOG JViews, etc.) and the other existing components 170. According to exemplary embodiments, the VOM Server Application 130 may include a VOM Event Messaging Framework 132 to facilitate event traffic to and from the production monitoring tools 140 and the VOM Client Application 114, and thus, the user. Event traffic may include information such as network status, application-level component status, affected components, impacted applications, outage issues, outage causes, user impact details, current tasks being performed, prior task performed, task progress, individual technicians and other personnel involved in the outage, etc.

The data collection plug-ins 134 of the VOM Server application 130 may be described as individual sub-modules corresponding to each of the components of the monitoring tools 140 that interact with the VOM Server Application 130. For instance, these plug-ins 134 may interact with the individual monitoring tools 140 at an application programming interface ("API") level utilizing a monitoring technology such as Java Management Extensions ("JMX"). A VOM repository 136 of the VOM Server application 130 may include a library of visual components that are associated with various available outage battlefields. Accordingly, the VOM repository 136 may include data regarding outage details, historical information, metrics, key learning summaries, etc.

Once monitoring data has been collected and retained by the VOM Server Application 130 of the VOM tool 110, the data may be processed and transferred to the VOM Client Application 120. The VOM Client Application 120 may include an embedded visual battlefield plug-in 122, a primary user interface 124, and a 2D data connector framework 126. The 2D data connector framework 126 may enable fast, double-buffered updates to the visual battlefield plug-in 122 via data sources. The visual battlefield plug-in 142 may be defined and constructed from components of the visualization systems 160, specifically a diagrammer 162 (e.g., JViews Diagrammer), a symbol editor 164 (e.g., JViews Symbol Editor), and custom palettes 166 (e.g., JViews Palette).

Through the use of each of these visualization tools 160, the visual battlefield plug-in 126 may quickly articulate the scope of an outage by generating a real-time, interactive, 3D visual representation of the outage components. This visual representation may be continuously updated and displayed to the user via the user interface 124 as a visual battlefield.

As will be described in greater detail, the VOM wizard plug-in 135 uses outage "scenario data" defined by the wizard and captured by the VOM tool 110. The wizard plug-in 135 is unique in that it represents both logical and statistical weighted data that is configurable in order to generate an instant outage triage guide. Accordingly, the VOM wizard plug-in 135 may generate various triage reports of the historical data of the VOM repository 136 and provide the reports to the VOM reporting tool 180. These reports include post-outage metrics, diagnosis data, and resolution data related to an outage. For instance, detailed reports may be generated from the collected and processed data, such as, but not limited to, the monitoring data, diagnostic data, resolution data, visual plug-in data, user input, etc.

Therefore, the exemplary VOM wizard plug-in 135 used in conjunction with the VOM tool 110 may provide all levels of personnel with the ability to manage and monitor a production outage at a more meaningful and useful level of detail, while also helping to facilitate communication and collaboration. In addition, technical engineers will benefit by having better insight into the underlying scope of the outage, as well as the progress being made. Using information collected by the VOM tool 110, the wizard plug-in 135 may also generate reports on based on the events and communications occurring before, during and after an outage.

Figure 2:
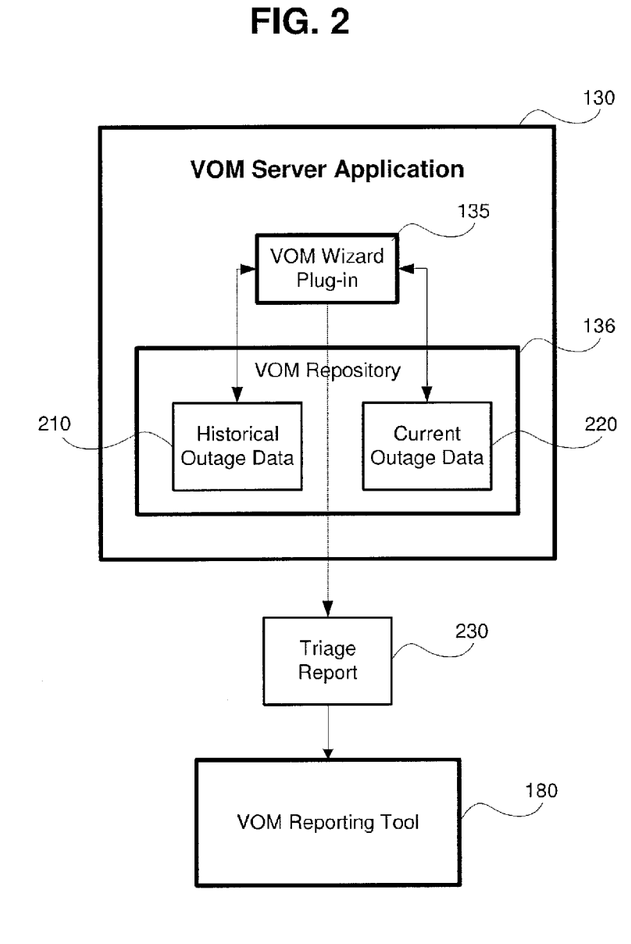
FIG. 2 shows an exemplary wizard plug-in for analyzing outage data via the visual outage management ("VOM") tool and generating an instant outage triage guide according to an exemplary embodiment.

FIG. 2 shows an exemplary wizard plug-in 135 for analyzing outage data via the visual outage management ("VOM") tool 110 and generating an instant outage triage guide 230 according to an exemplary embodiment. As described above, the VOM tool 110 may utilize modular plug-ins for visually monitoring production environments, such as networks and their application-level components. Each of the plug-ins 134 may be an interactive visual representation of any number of servers (e.g., web servers, portal/application servers, etc.), databases and other components of the network being monitored.

While in communication with the VOM repository 136, the wizard plug-in 135 may access information related to historical outage data 210 (e.g., previous outages) and current outage data 220 (e.g., present outage or most recent outage). The historical information retrieved from the VOM repository 136 may include overall network status, application-level component status, affected components, impacted applications, outage issues, outage causes, user impact details, current tasks being performed, prior task performed, task progress, and personnel involved in the outage. Further contextual data may also include user resolution ratings, user blogging activity, as well as relevant data concerning priorities, missing personnel, late check-ins, etc.

According to the exemplary embodiments, the wizard plug-in 135 may correlate the current outage data 220 with the historical outage data 210 and dynamically construct the most efficient step-by-step path to resolution for the current outage, as well as for future similar outages. The analysis of this correlation allows for the plug-in 135 to formulate the sequential steps of the outage resolution plan, or triage guide 230. Accordingly, the constructed resolution plan may be communicated from the VOM Server Application 130 to the VOM Reporting Tool 180 by way of the wizard plug-in 135 in order to resolve the issue as quickly as possible.

The exemplary triage guide 230 provided by the VOM wizard plug-in 135 may include information such as, but not limited to: step-by-step restoration actions based on weighted values and collaborative user resolution ratings; lists of previous attendees representing specific failing components; various "scorecard" metrics including check-in times, MTTR both on the overall network and on a per component basis, historical dashboard correlation, etc. In addition, the VOM wizard plug-in 135 may also allow the user to select and manually compare a number of historical outages to be used for reporting purposes. The wizard plug-in 135 may process and identify improvement opportunities for future similar outages. Furthermore, the plug-in 135 may provide a simple snapshot report (e.g., "stare and compare" report) between multiple outages for presentation to executive management.

Figure 3:
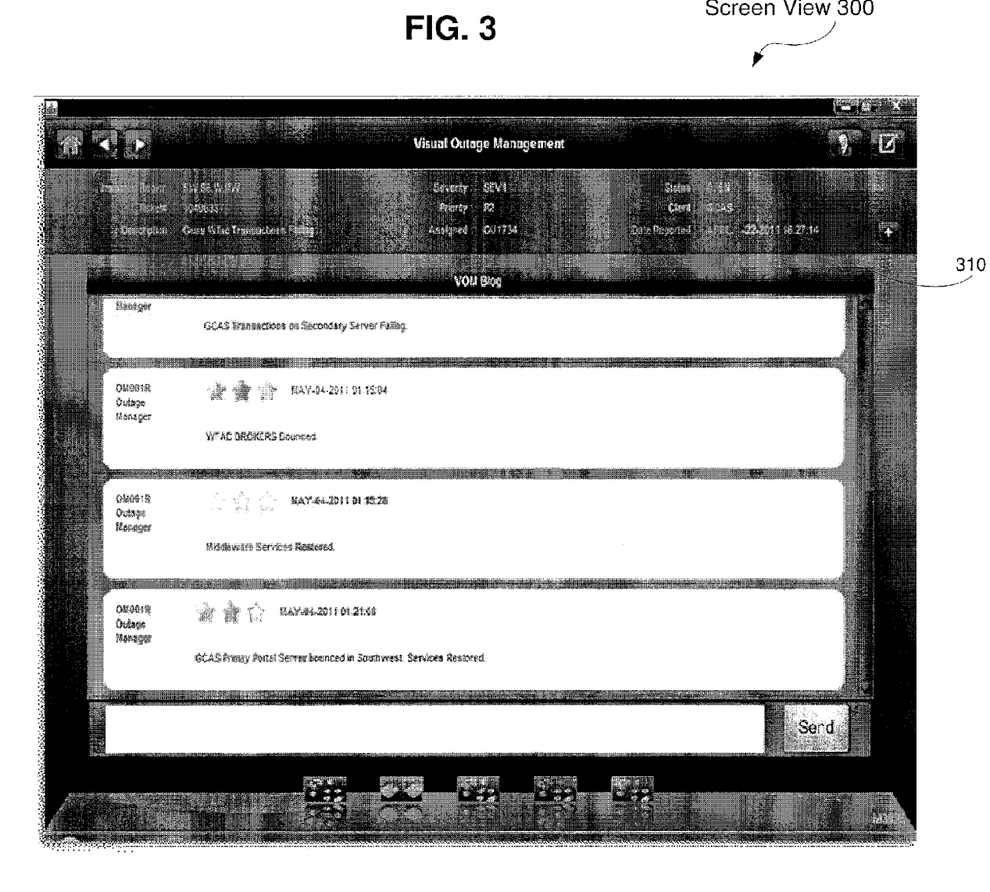
FIG. 3 shows an exemplary screen view of a VOM blog including entries added during an active outage according to an exemplary embodiment.

FIG. 3 shows an exemplary screen view 300 of a VOM blog 310 including entries added during an active outage according to an exemplary embodiment. While an outage is in progress, the attendees logged into the Visual Outage Management application to perform various restorative actions. Some of these actions result in generated system events which flow into the VOM blog 310 and logged against the outage. Other restorative actions do not result in system events and therefore the user blogs will transcribe the action and/or informative information (e.g., configuration changes, reboots, noteworthy insights or observations that can assist in quicker diagnosis or resolution, etc.). Furthermore, while some entries are manual user-created entries, additional entries are system-generated events which flow into the VOM Blog 310. In either case, entries can be edited and rated accordingly. All of this valuable information becomes part of the VOM Blog 310 and thus associated with this outage and the particular VOM Battlefield. The format of such blog entries may be similar in style and structure as other familiar online star rating and review blogging systems.

As seen in FIG. 3 above, the entries of the VOM Blog 310 consist of date, time, user information, stars ratings, as well as the ability to add follow-on sub-posts which can also be rated. During a scenario in which high user traffic causes a service to stop responding, an exemplary manual entry would indicate a manual server re-start to clear the requests and restore orderly data flow. The entry would capture the time of the restart, user info, name, team, etc. If the issue is resolved, the entry in the VOM blog 310 would receive a higher rating.

In some cases, the entry does not resolve the issue and there may be a secondary blog entry that includes configuration change information (e.g., a new system address to re-direct traffic to a new server or service which will handle the additional traffic). In this case the previous entry will be rated low, the follow-up entry will be rated higher, and the VOM wizard plug-in 135 would provide an appropriate suggestion. For instance, the VOM wizard plug-in 135 would suggest the secondary action to be performed first, performed sooner in the outage, and provide the insight of the possible cause up-front before any time-consuming guesswork is performed by the outage attendees.

To further determine weighted value and priority of particular actions for a battle plan, the VOM wizard plug-in 135 would determine the priority and importance of the actions based any number of factors. These factors may include: the time the action was performed, the user rating of the action, the time and rating of the action relative to overall outage duration, the priority of the action based on its final sort order in previous and similar outages relative to other actions and their ratings, etc.

It should be noted that although the practice of blogging may be real-time and somewhat sporadic during an outage, a good practice and process for post outages is to review the entries with attendees to apply valuable hindsight and refinement. Each of the captured entries will be reviewed, edited, re-rated as necessary. Additional entries may also be added at that time so that a complete accounting of important actions, ratings, re-sorting, etc., will provide an accurate accounting of relevant information. Accordingly, the VOM wizard plug-in 135 is able to create a more accurate battle plan for the next outage.

Thus, the exemplary VOM wizard plug-in 135 provides all levels of users with instant insight on historic and current network outages. The VOM wizard plug-in 135 equips centralized support personnel with essential and unique triage information to better solve an outage and reduce the required resolution time in a much more efficient and aggressive manner.

Figure 4:
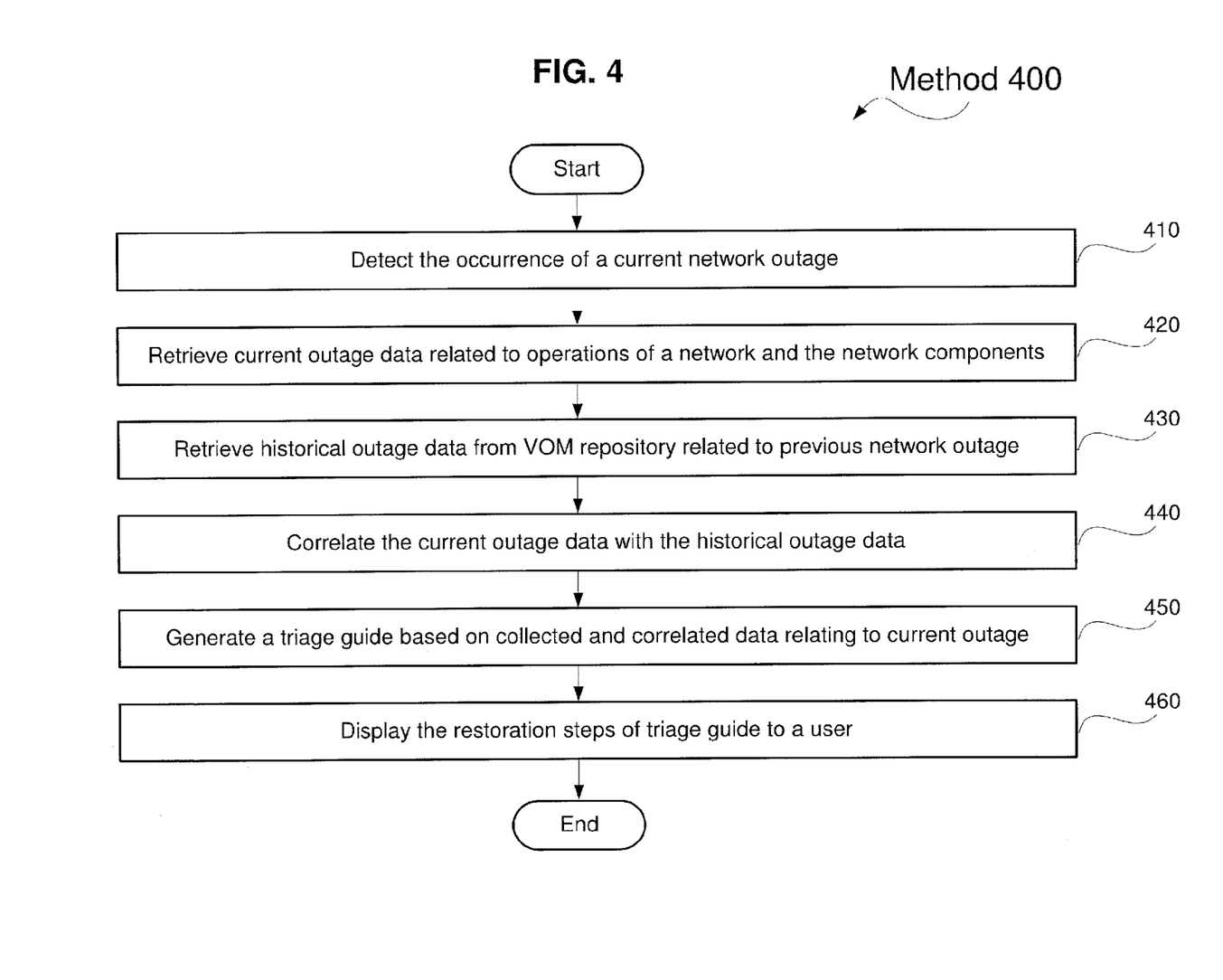
FIG. 4 shows an exemplary method for correlating current outage data with historical outage data and constructing a resolution process according to an exemplary embodiment.

FIG. 4 shows an exemplary method 400 for correlating current outage data with historical outage data from the VOM repository 136 and constructing a resolution process (e.g., triage guide 230) according to an exemplary embodiment. It should be noted that method 400 will be discussed with reference to the VOM wizard plug-in 135 and the VOM tool 110 of FIGS. 1 and 2. It should be further noted that each of the steps in method 400 may be performed by either the VOM wizard plug-in 135 or the VOM tool 110, itself.

The unique and logical approach of the exemplary method 400 automates and supplements the learning process for outage resolution, whereby previous experience and/or attendance of specific outages by network personnel is much less relevant to the efficient response and restoration efforts. The VOM wizard plug-in 135 described herein becomes the active and current knowledge based transfer agent, supplementing disparate support notes, "lessons learned" activities, and any disparities in technical experience. Thus, participation in a previous or similar outage is now much less relevant.

Beginning with step 410, the VOM wizard plug-in 135 may detect the occurrence of a current network outage. As noted above, once the network outage occurs, the VOM wizard plug-in 135 becomes an active, real-time knowledge transfer agent incorporating critical information from prior outages with the information pertaining to the current outage. The VOM wizard plug-in 135 takes a unique holistic approach to applying historical and contextual information, as well as human factor data, to determine guidelines for resolving the current outage.

In step 420, the VOM wizard plug-in 135 may retrieve and store current outage data related to monitoring operations of a network and the application-level components of the VOM tool 110. For instance, upon processing the monitoring data, the VOM tool 110 may reveal that absent network personnel and/or one or more mission critical applications are down, or otherwise malfunctioning. Accordingly, the missing personnel or malfunctioning application may lead to further downstream applications fails to function, and thus, an outage. For example, the VOM wizard plug-in 135 may note that Employee X arrived 30 minutes after the occurrence of the outage and Employee X performed restoration action Y 30 minutes thereafter.

In step 430, the VOM wizard plug-in 135 may retrieve and store historical outage data from the VOM repository 136 related to previous monitoring operations of the network. As detailed above, the historical outage data may include any information relevant to network operation and network personnel, such as contextual data, user resolution ratings, blog information, as well as prior data concerning priorities, missing personnel, late check-ins, etc. Using the example referenced above, the VOM wizard plug-in 135 may note a previous late check-in by Employee X and later performance of restoration action Y.

In step 440, the VOM wizard plug-in 135 may correlate the current outage data with the historical outage data. This correlation may identify the specific conditions that are causing the outage and associate historical data related to these conditions. Returning to the example detailed above, the VOM wizard plug-in 135 may identify the importance of the presence of Employee X and the performance of action Y. Accordingly, these conditions may be prioritized during the generation of a resolution plan.

Furthermore, the correlation may generate "trouble alerts" to identify which components (e.g., visual dashboards) have been associated with a similar sequence of alarms, and in conjunction with specific networking elements. Therefore, the VOM wizard plug-in 135 may easily identify who was present or absent during the outage, what actions are responsible for the outage, and where the origin of the outage lies within the network.

In step 450, the VOM wizard plug-in 135 may generate a detailed triage guide 230 based on all collected and correlated data relating to the current outage, such as, but not limited to, the monitoring data, diagnostic data and resolution data of both the current outage and any similar outages within the historical information. Accordingly, the triage guide 230 may include detailed step-by-step instructions for resolving the current outage based on the network components involved and the personnel involved.

The triage report 230 may include highlighted improvement suggestions based on the correlated metrics and conditions of all collected data. The triage report 230 may also generate a score, or scorecard, for the current outage based on any number of factors, such as the MTTR, the type of outage, a degree of severity, an expected duration of the outage, the number of components/personnel involved, the number of outage-related events that occurred, etc.

In step 460, the VOM tool 110 may display the restoration steps of triage guide 230 to a user. In addition, the VOM tool 110 may display details of all parties (e.g., teams and individuals) involved with the resolution of the outage. Furthermore, the VOM tool 110 may receive user input, such a request for more detailed information on a specific network component within the triage guide 230. Accordingly, the VOM tool 110 may provide the additional data upon user request.

The exemplary method 400 described above is merely an example of any number of steps performable by the VOM tool 110, the VOM wizard plug-in 135 and any related components of the system 100. Accordingly, the VOM wizard plug-in 135 is not limited to steps recited in exemplary method 400, and may perform additional steps or less steps than steps 410-460 and any of the respective sub-steps. Furthermore, the exemplary method 400 may be stored as a set of instructions or software code on a non-transitory computer readable storage medium, such as a computer memory. Accordingly, this set of instructions may be executable by a processor and may be operable at least to perform the steps of the exemplary method 400 depicted in FIG. 4.

According to the exemplary embodiments, the VOM wizard plug-in 135 and the corresponding method 400 may allow for efficient communication and collaboration amongst all levels of personnel involved in an outage. Specifically, the resulting benefits of the wizard plug-in 135 and its resulting triage guide 230 is a reduction of repair time, a more efficient and effective triage effort at the start of a new and/or subsequent outage, and an autonomous agent which hosts, correlates, retrieves and represents critical "outage scenario data" in a manner that may benefit and guide the reduction in current restoration efforts.

From a broader perspective, the VOM tool 110 in conjunction with the wizard plug-in 135 may provide useful and insightful monitoring metrics and charts, graphs, and reports that result in improved decision making. The monitoring data may be tracked during all stages of operation (e.g., before, during and after an outage). Thus, the VOM tool 110 may effectively contribute to the achievement of increased clarity and understanding as to the scope and severity of the outage for all outage attendees, thereby contributing to the reduction in MTTR during a critical outage.

As an outage goes through various stages of diagnosis, and different work tasks are performed to resolve the issues, the VOM tool 110 provides a cohesive glue necessary to keep all attendees (technical, managerial, executive, etc.) on the same page. The VOM tool 110 may provide visual status updates, component-level attendance, an accessible HUD, history tracking and reporting, relative health and process details, as well as metrics and key learnings for post-outage analysis and consumption. Since the VOM tool 110 operates with existing components in a network, the VOM tool 110 provides this capability without the high cost of large enterprise applications having limited capabilities.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A method, comprising:
    retrieving current outage data related to a current network outage;
    retrieving historical outage data related to prior network outages;
    correlating the current outage data with the historical outage data;
    selecting one of the prior network outages based on the correlating; and
    constructing a resolution process plan for repairing the current network outage based on a prior resolution process that resolved the selected one of the prior network outages.

2. The method of claim 1, further comprising:
    providing network operation improvement suggestions within the resolution process plan.

3. The method of claim 1, further comprising:
    calculating a score for one of a network component and network personnel; and
    providing prioritized steps within the resolution process report based on the score.

4. The method of claim 1, wherein correlating the current outage data with the historical outage data includes identifying common personnel attendance between the current network outage and the prior network outage.

5. The method of claim 1, wherein correlating the current outage data with the historical outage data includes identifying a common action performed during both the current network outage and the prior network outage.

6. The method of claim 1, wherein the method is performed by a software agent of a browser-based software application.

7. The method of claim 1, wherein the current outage data and the historical outage data include information related to one of network status, application-level component status, affected components, impacted applications, outage issues, outage causes, user impact details, current tasks being performed, prior task performed, and task progress.

8. A non-transitory computer readable storage medium including a set of instructions that are executable by a processor, the set of instructions causing the processor to:
    retrieve current outage data related to a current network outage;
    retrieve historical outage data related to a prior network outages;
    correlate the current outage data with the historical outage data;
    select one of the prior network outages based on the correlating; and
    construct a resolution process plan for repairing the current network outage based on a prior resolution process that resolved the selected one of the prior network outages.

9. The non-transitory computer readable storage medium of claim 8, wherein the set of instructions further cause the processor to:
    provide network operation improvement suggestions within the resolution process plan.

10. The non-transitory computer readable storage medium of claim 8, wherein the set of instructions further cause the processor to:
    calculate a score for one of a network component and network personnel; and
    provide prioritized steps within the resolution process report based on the score.

11. The non-transitory computer readable storage medium of claim 8, wherein correlating the current outage data with the historical outage data includes identifying common personnel attendance between the current network outage and the prior network outage.

12. The non-transitory computer readable storage medium of claim 8, wherein correlating the current outage data with the historical outage data includes identifying common action performed during both the current network outage and the prior network outage.

13. The non-transitory computer readable storage medium of claim 8, wherein the non-transitory computer readable storage medium interacts with a software agent of a browser-based software application.

14. The non-transitory computer readable storage medium of claim 8, wherein the current outage data and the historical outage data include information related to one of network status, application-level component status, affected components, impacted applications, outage issues, outage causes, user impact details, current tasks being performed, prior task performed, and task progress.

15. An outage management plug-in tool, comprising:
    a data retrieval component retrieving current outage data related to a current network outage, wherein the data retrieval component further retrieves historical outage data related to prior network outages;
    a processing component correlating the current outage data with the historical outage data;
    a selecting component selecting one of the prior network outages based on the correlating; and
    a reporting component constructing a resolution process plan for repairing the current network outage based on a prior resolution process that resolved the selected one of the prior network outages,
    wherein the data retrieval component, the processing component, the selecting component and the reporting component are implemented by one or more processors, and wherein the one or more processors are coupled to a non-transitory memory.

16. The outage management plug-in tool of claim 15, wherein the reporting component provides network operation improvement suggestions within the resolution process plan.

17. The outage management plug-in tool of claim 15, wherein the reporting component calculates a score for one of a network component and network personnel and provides prioritized steps within the resolution process report based on the score.

18. The outage management plug-in tool of claim 15, wherein correlating the current outage data with the historical outage data includes identifying common personnel attendance between the current network outage and the prior network outage.

19. The outage management plug-in tool of claim 15, wherein correlating the current outage data with the historical outage data includes identifying common action performed during both the current network outage and the prior network outage.

20. The outage management tool of claim 15, wherein the outage management plug-in tool is a software agent within a browser-based software application.

* * * * *